US010099711B1

(12) United States Patent
Sun (10) Patent No.: US 10,099,711 B1
(45) Date of Patent: Oct. 16, 2018

(54) TRANSLATIONAL COLLAPSIBLE WAGON

(71) Applicant: Blue Ridge Recreational Gear, LLC, Tybee Island, GA (US)

(72) Inventor: Benlong Sun, Zhejiang (CN)

(73) Assignee: Blue Ridge Recreational Gear, LLC, Tybee Island, GA (US)

( * ) Notice: Subject to any disclaimer, the term of this patent is extended or adjusted under 35 U.S.C. 154(b) by 0 days.

(21) Appl. No.: 15/806,864

(22) Filed: Nov. 8, 2017

(30) Foreign Application Priority Data

Jun. 9, 2017 (CN) .......................... 2017 1 0449973
Jun. 9, 2017 (CN) .......................... 2017 1 0449974
Jun. 9, 2017 (CN) ..................... 2017 2 0694905 U
Jun. 9, 2017 (CN) ..................... 2017 2 0694971 U
Jun. 9, 2017 (CN) ..................... 2017 2 0694972 U (Continued)

(51) Int. Cl.
*B62B 3/02* (2006.01)
*B60B 33/00* (2006.01)
*B62B 5/06* (2006.01)

(52) U.S. Cl.
CPC ............ *B62B 3/02* (2013.01); *B60B 33/0021* (2013.01); *B60B 33/0026* (2013.01); *B62B 5/065* (2013.01)

(58) Field of Classification Search
CPC ........... B62B 3/02; B62B 3/025; B62B 3/027; B62B 5/064; B62B 5/065; B60B 33/0021; B60B 33/0026

(Continued)

(56) References Cited

U.S. PATENT DOCUMENTS

D411,387 S     6/1999  Zheng
5,975,626 A   11/1999  Aycock
(Continued)

FOREIGN PATENT DOCUMENTS

WO   WO 2017088535 A1   6/2017
WO   WO 2017088536 A1   6/2017

OTHER PUBLICATIONS

Amazon results for creative design wagon.
(Continued)

*Primary Examiner* — John D Walters
(74) *Attorney, Agent, or Firm* — WPAT, P.C., Intellectual Property Attorneys; Anthony King (57) ABSTRACT

A translational collapsible wagon includes a frame assembly, a tow bar assembly and wheels. The frame assembly includes a bottom frame, a front frame, a rear frame and collapsible side frames arranged on the left side and the right side of the bottom frame. Each side frame includes coplanar X-shaped cross tube assemblies. Each coplanar X-shaped cross tube assembly includes a first oblique tube, two second oblique tubes and a hollow seat. A strip opening is formed in the middle of the hollow seat in the front-back direction. Tube connectors are oppositely arranged at the front end and the rear end of the hollow seat in the vertical direction respectively. The first oblique tube penetrates through the strip opening and is hinged to the middle of the strip opening at the center through a hinge shaft. The two second oblique tubes are mounted in the tube connectors at the front end and the rear end of the hollow seat respectively and arranged in parallel and intersect with the first oblique in an X shape. The first oblique tube, the two second oblique tubes and the hollow seat are all located on the same plane.

19 Claims, 8 Drawing Sheets

(30) Foreign Application Priority Data

| | | |
|---|---|---|
| Jun. 9, 2017 | (CN) | 2017 2 0694973 U |
| Jun. 9, 2017 | (CN) | 2017 2 0694974 U |
| Jun. 9, 2017 | (CN) | 2017 2 0694975 U |
| Jun. 9, 2017 | (CN) | 2017 2 0695021 U |
| Jun. 9, 2017 | (CN) | 2017 2 0695022 U |
| Jun. 9, 2017 | (CN) | 2017 2 0695023 U |
| Jul. 27, 2017 | (CN) | 2017 2 0948557 U |

(58) Field of Classification Search

USPC .............................. 280/639, 651, 655.1, 659
See application file for complete search history.

(56) References Cited

U.S. PATENT DOCUMENTS

| | | | |
|---|---|---|---|
| D432,325 S | 10/2000 | Zheng et al. | |
| D432,823 S | 10/2000 | Zheng | |
| D433,244 S | 11/2000 | Zheng | |
| D433,574 S | 11/2000 | Zheng | |
| 6,158,361 A | 12/2000 | Zheng et al. | |
| 6,231,119 B1 | 5/2001 | Zheng | |
| 6,234,089 B1 | 5/2001 | Zheng et al. | |
| 6,237,993 B1 | 5/2001 | Zheng | |
| 6,241,311 B1 | 6/2001 | Zheng | |
| 6,247,748 B1 | 6/2001 | Zheng | |
| 6,296,304 B1 | 10/2001 | Zheng | |
| 6,302,479 B1 | 10/2001 | Zheng | |
| 6,364,411 B1 | 4/2002 | Zheng | |
| 6,494,530 B1 | 12/2002 | Zheng | |
| D515,830 S | 2/2006 | Zheng | |
| D516,825 S | 3/2006 | Zheng | |
| D516,826 S | 3/2006 | Zheng | |
| D517,819 S | 3/2006 | Zheng | |
| 7,100,975 B1 | 9/2006 | Zheng | |
| 7,281,731 B2 * | 10/2007 | Shamah | B62B 1/12 280/639 |
| 7,328,940 B2 | 2/2008 | Zheng | |
| 7,396,073 B2 | 7/2008 | Zheng | |
| 7,441,287 B2 | 10/2008 | Zheng | |
| 8,011,686 B2 * | 9/2011 | Chen | B62B 3/007 280/651 |
| 8,172,256 B2 * | 5/2012 | Fine | B62B 3/027 280/38 |
| 8,973,940 B2 * | 3/2015 | Chen | B62B 3/02 280/35 |
| 9,073,564 B2 | 7/2015 | Yang et al. | |
| 9,211,897 B2 | 12/2015 | Yang et al. | |
| 2005/0275195 A1 * | 12/2005 | Matula | B62B 3/02 280/651 |
| 2017/0259838 A1 * | 9/2017 | Choi | B62B 3/025 |

OTHER PUBLICATIONS

Amazon results for "Mac Sports Collapsible Folding Outdoor Utility Wagon".
Amazon results for "Rio Wagon".

* cited by examiner

TRANSLATIONAL COLLAPSIBLE WAGON

PRIORITY/RELATED DOCUMENTS

This patent application incorporates by reference in their entireties and claims priority to these co-pending Chinese patent applications filed on Jun. 9, 2017; namely, Application Nos. 201720694971.X; 201720694972.4; 201710449974.1; 201720695021.9; 201720694974.3; 201720695022.3; 201720695023.8; 201720694975.8; 201720694905.2; 201710449973.7; 201720694973.9 and filed on Jul. 27, 2017, namely Application No. 201720948557.7 all entitled the following; namely, one or more version of a pull-cart; namely "Translational Collapsible Wagon (Chinese Translation)," "Folding Collapsible Wagon (Chinese Translation)", and all with the same inventor(s).

COPYRIGHT NOTICE

This disclosure contains material which is subject to copyright protection. The copyright owner makes no objection to reproduction of this disclosure as disclosed in the Patent and Trademark Office files, record, or the like. Otherwise, the copyright owner reserves all copyright rights whatsoever for this patent disclosure. 37 CFR 1.71(d).

BACKGROUND OF THE DISCLOSURE

The following information may be useful in a better understanding of this disclosure. Please note that information contained in this section is not an admission that the information provided is material or prior art to this disclosure or as described in claimed disclosure, or that any publication or document that is specifically, implicitly or otherwise referenced is prior art.

Technical Field

The disclosure relates to the technical field of wagons, in particular to a translational collapsible wagon.

Description of Related Art

According to most translational collapsible wagons on the market, two steel tubes with the same length are riveted together to form an X-shaped assembly after holes are punched in the centers of the steel tubes. Although the structure is simple, however, the steel tubes are connected front and back in an overlapping mode. Consequently, after a wagon is assembled, brackets connected with the X-shaped assemblies have to be staggered up and down along the distance by one steel tube so as to be mounted. As a result, the following wagon attributes are affected; namely, after the wagon is folded or unfolded, attractiveness of this structure is adversely affected, the available space of the wagon is narrowed, and the volume rate of the wagon is affected.

BRIEF SUMMARY OF THE DISCLOSURE

For overcoming the defects that an existing collapsible wagon being inconvenient to mount and not attractive enough, the disclosure provides a translational collapsible wagon which is large in volume and attractive.

According to the technical scheme adopted by the disclosure for solving the technical problems:

In one aspect of an embodiment, a translational collapsible wagon is disclosed that includes a frame assembly, a tow bar assembly and wheels. The tow bar assembly is arranged in front of the frame assembly, the wheels are arranged at the bottom of the frame assembly, and the frame assembly comprises a bottom frame, a front frame arranged in front of the bottom frame, a rear frame arranged behind the bottom frame, and collapsible side frames arranged on the left side and the right side of the bottom frame. The front frame includes an upper cross beam, a lower cross beam, inner guide tubes and outer guide tubes, the inner guide tubes and the outer guide tubes are all arranged vertically. Each side frame comprises coplanar X-shaped cross tube assemblies. Each coplanar X-shaped cross tube assembly comprises a first oblique tube, two second oblique tubes and a hollow seat. A strip opening is formed in the middle of the hollow seat in the front-back direction, tube connectors are oppositely arranged at the front end and the rear end of the hollow seat in the vertical direction respectively.

In some embodiments, the first oblique tube is at least 50% greater in length than either of the two second oblique tubes. In some embodiments, the first oblique tube is greater than 2 times as great in length as either of the two second oblique tubes.

In some embodiments, the first oblique tube penetrates through the strip opening and is hinged to the middle of the strip opening at the center through a hinge shaft, and the two second oblique tubes are mounted in the tube connectors at the front end and the rear end of the hollow seat respectively. The two second oblique tubes are arranged in parallel and intersect with the first oblique tube in an X shape, and the first oblique tube, the two second oblique tubes and the hollow seat are all located on the same plane.

In some embodiments, the front ends and the rear ends of the side frames are hinged to the front frame and the rear frame through upper brackets and lower brackets respectively. The bottom frame includes a front bottom beam and a rear bottom beam. The rear end of the front bottom beam and the front end of the rear bottom beam can be turned by 90 degrees to be hinged together. The front end of the front bottom beam is hinged to the lower brackets of the front frame, and the rear end of the rear bottom beam is hinged to the lower brackets of the rear frame.

In some embodiments, the upper ends of the inner guide tubes are connected with the upper cross beam through the upper brackets, the lower ends of the inner guide tubes are mounted in the outer guide tubes in a vertically telescopic mode, and the lower ends of the outer guide tubes are connected with the lower cross beam through the lower brackets.

In one example, the structure of the rear frame is the same as the structure of the front frame.

In some embodiments, each side frame includes two coplanar X-shaped cross tube assemblies arranged side by side, and the two coplanar X-shaped cross tube assemblies are the front coplanar X-shaped cross tube assembly and the rear coplanar X-shaped cross tube assembly respectively.

In some embodiments, the front end of the first oblique tube of the front coplanar X-shaped cross tube assembly of the side frame on the left side of the bottom frame is hinged to the lower bracket on the left side of the front frame, and, for example, the rear end of the first oblique tube of the front coplanar X-shaped cross tube assembly of the side frame on the left side of the bottom frame is hinged to the front end of the front second oblique tube of the rear coplanar X-shaped cross tube assembly on the same side through a hinged joint.

In some embodiments, the front end of the front second oblique tube of the front coplanar X-shaped cross tube assembly of the side frame on the left side of the bottom frame is hinged to the upper bracket on the left side of the front frame. In one example, the rear end of the rear second oblique tube of the front coplanar X-shaped cross tube assembly of the side frame on the left side of the bottom frame is hinged to the left end of a bottom beam support bar. In one example, the front end of the first oblique tube of the rear coplanar X-shaped cross tube assembly of the side frame on the left side of the bottom frame is hinged to the left end of the bottom beam support bar. In one example, the rear end of the first oblique tube of the rear coplanar X-shaped cross tube assembly of the side frame on the left side of the bottom frame is hinged to the upper bracket of the rear frame, and the rear end of the rear second oblique tube of the rear coplanar X-shaped cross tube assembly of the side frame on the left side of the bottom frame is hinged to the lower bracket on the left side of the rear frame.

In some embodiments, the front end of the first oblique tube of the front coplanar X-shaped cross tube assembly of the side frame on the right side of the bottom frame is hinged to the upper bracket on the right side of the front frame, and the rear end of the first oblique tube of the front coplanar X-shaped cross tube assembly of the side frame on the right side of the bottom frame is hinged to the right end of the bottom beam support bar.

In one example, the front end of the front second oblique tube of the front coplanar X-shaped cross tube assembly of the side frame on the right side of the bottom frame is hinged to the lower bracket on the right side of the front frame, and the rear end of the rear oblique second tube of the front coplanar X-shaped cross tube assembly of the side frame on the right side of the bottom frame is hinged to the front end of the first oblique tube of the rear coplanar X-shaped cross tube assembly on the same side through a hinged joint.

In some embodiments, the rear end of the first oblique tube of the rear coplanar X-shaped cross tube assembly of the side frame on the right side of the bottom frame is hinged to the lower bracket on the right side of the rear frame. The front end of the front second oblique tube of the rear coplanar X-shaped cross tube assembly of the side frame on the right side of the bottom frame is hinged to the right end of the bottom beam support bar, and the rear end of the rear second oblique tube of the rear coplanar X-shaped cross tube assembly of the side frame on the right side of the bottom frame is hinged to the upper bracket of the rear frame.

In some embodiments, the bottom beam support bar is located below the hinge point of the front bottom beam and the rear bottom beam.

Furthermore, the tow bar assembly comprises a handle, an upper tow bar, a lower tow bar, a telescopic mechanism, a button, a gear adjustment mechanism and a tow bar seat. In one example, the upper end of the upper tow bar is fixedly connected with the handle, the lower end of the upper tow bar is mounted in the lower tow bar in a vertically telescopic mode through the telescopic mechanism, and the lower end of the lower tow bar is mounted on the tow bar seat through a tow bar head.

In some embodiments, the telescopic mechanism comprises an ejection bar, a shifting fork, an ejection column and a double-headed spherical body. In one example, the ejection bar is located in the upper tow bar and, for example, the upper end of the ejection bar is connected with the button.

In one instance, the button is located in the upper tow bar and mounted at the position of the handle and the shifting fork is fixed to the lower end of the ejection bar. The double-headed spherical body is fixed to the bottom of the shifting fork from bottom to top through the ejection column, and two spherical bodies of the double-headed spherical body stretch leftwards and rightwards out of the upper tow bar respectively.

In some embodiments, spherical openings are used for allowing the two spherical bodies of the double-headed spherical body to be clamped therein are formed in the left right and the right side of the upper end of the lower tow bar respectively, and the portions, where the spherical openings are located, of the upper end of the lower tow bar are sleeved with protective jackets.

In some embodiments, the gear adjustment mechanism comprises a tow bar seat, gears, a gear spring and a positioning bolt. In an example, the upper portion of the tow bar head is fixedly connected with the lower end of the lower tow bar, the gears are mounted on the left side and the right side of the tow bar head, and gear teeth are arranged on the sides, facing the tow bar head, of the gears. In an example, the lower portion of the tow bar head is in a roller shape, and gear grooves used for being matched with the gear teeth are formed in the left end and the right end of the roller respectively.

In some embodiments, the gear spring is located in the roller, and the left end and the right end of the gear spring are connected with the gears respectively; the lower portion of the tow bar seat is fixed to a frame, the upper portion of the tow bar seat is in a U shape, and the tow bar head is located in the U shape.

In some embodiments, the positioning bolt sequentially penetrates through the right side of the upper portion of the tow bar seat, the gears on the right side of the tow bar head, the right side of the tow bar head, the gear spring, the left side of the tow bar head, the gears on the left side of the tow bar head and the left side of the upper portion of the tow bar seat from right to left to be connected with a nut. In an example, the gears are arranged on the positioning bolt in a sleeving mode, the gear teeth on the gears are inserted into the gear grooves in the tow bar head, and the gears rotate around the positioning bolt along with the tow bar head and move leftwards and rightwards in the axial direction of the positioning bolt under the effect of the gear spring. In an example, the tow bar head is arranged on the positioning bolt in a sleeving mode and can rotate around the positioning bolt.

Furthermore, the wheels are connected with the lower brackets through wheel quick-dismounting mechanisms. In one instance, each wheel quick-dismounting mechanism includes a wheel carrier, a wheel lock ring and a wheel lock ring reset spring, the wheels are rotatably mounted on the wheel carriers, limiting shafts are arranged at the tops of the wheel carriers, and annular clamping grooves are formed in the upper portions of the limiting shafts.

In some embodiments, limiting shaft mounting openings are formed in the lower brackets in the axial direction, wheel lock ring limiting openings used for allowing the wheel lock rings to be placed therein are formed in the lower brackets in the horizontal direction, the wheel lock rings are mounted in the wheel lock ring limiting openings in a horizontal moving mode through the wheel lock ring reset springs, and the wheel lock ring limiting openings communicate with the limiting shaft mounting openings.

In some embodiments, the limiting shafts penetrate through the limiting shaft mounting openings and the wheel lock rings from bottom to top, and the wheel lock rings are clamped in the annular clamping grooves of the limiting shafts under the effect of the wheel lock ring reset springs.

Furthermore, the wagon may further comprise a cloth cover quick-dismounting mechanism, and a cloth cover is mounted on the frame assembly through the cloth cover quick-dismounting mechanism. In one example, the cloth cover quick-dismounting mechanism comprises cloth cover lock rings, cloth cover lock ring reset springs and limiting caps. In one example, cloth cover mounting grooves are used for allowing cloth cover connecting pieces connected with the cloth cover to be placed therein and cloth cover lock ring limiting openings used for allowing the cloth cover lock rings to be placed therein are formed in the upper brackets in the horizontal direction, and the lock ring limiting openings are located below the cloth cover mounting grooves.

In some embodiments, limiting cap mounting openings are formed in the upper brackets in the axial direction and communicate with the cloth cover mounting grooves and the cloth cover lock ring limiting openings, and the cloth cover lock rings are mounted in the cloth cover lock ring limiting openings in a horizontal moving mode through the cloth cover lock ring reset springs.

In some embodiments, annular clamping grooves are formed in the lower portions of the limiting caps, and the limiting caps penetrate through the limiting cap mounting openings, the cloth cover connecting pieces and the cloth cover lock rings from top to bottom, and the cloth cover lock rings are clamped in the annular clamping grooves in the limiting caps.

Furthermore, the tow bar assembly may comprises a handle, an upper tow bar, a lower tow bar, a telescopic mechanism, a button, a gear adjustment mechanism and a tow bar seat, wherein the upper end of the upper tow bar is fixedly connected with the handle, the lower end of the upper tow bar is mounted in the lower tow bar in a vertically telescopic mode through the telescopic mechanism, and the lower end of the lower tow bar is mounted on the tow bar seat through a tow bar head.

In some embodiments, the telescopic mechanism comprises an ejection bar, a steel ball seat, steel balls, an ejection spring and a spring seat, wherein the ejection bar is located in the upper tow bar, the upper end of the ejection bar is connected with the button, and the button is located in the upper tow bar and mounted at the position of the handle. In an example, the steel ball seat is fixed to the lower end of the ejection bar. In one example, the spring seat is located below the steel ball seat and mounted in the upper tow bar. In another example, the upper end of the ejection spring is connected with the steel ball seat, and the lower end of the ejection spring is mounted on the spring seat.

In one example, a positioning piece is arranged above the steel ball seat, and unlocking grooves and limiting grooves are formed in the steel ball seat from top to bottom, first limiting openings used for allowing the steel balls to be clamped therein for limiting are formed in the front side and the rear side of the lower end of the upper tow bar respectively, second limiting openings corresponding to the first limiting openings are formed in the front side and the rear side of the upper end of the lower tow bar respectively, and the portions, where the second limiting openings are located, of the upper end of the lower tow bar are sleeved with protective jackets.

In one example, the steel balls are clamped into the limiting grooves and the second limiting openings simultaneously when the upper tow bar stretches out of the lower tow bar and is locked, and the steel balls slide out of the limiting grooves to be clamped into the unlocking grooves when the upper tow bar retracts into the lower tow bar and is unlocked.

In some embodiments, the gear adjustment mechanism comprises gears, a gear spring and a positioning bolt, wherein the upper portion of the tow bar head is fixedly connected with the lower end of the lower tow bar, the gears are mounted on the left side and the right side of the tow bar head, and gear teeth are mounted on the sides, facing the tow bar head, of the gears. In an example, the lower portion of the tow bar head is in a roller shape, gear grooves used for being matched with the gear teeth are formed in the left end and the right end of the roller respectively, the gear spring is located in the roller, and the left end and the right end of the gear spring are connected with the gears respectively.

In some embodiments, the lower portion of the tow bar seat is fixed to the frame, the upper portion of the tow bar seat is in a U shape, and the tow bar head is located in the U shape. In an example, the positioning bolt sequentially penetrates through the right side of the upper portion of the tow bar seat, the gear seat on the right side of the tow bar head, the right side of the tow bar head, the gear spring, the left side of the tow bar head, the gear seat on the left side of the tow bar head and the left side of the upper portion of the tow bar seat from right to left to be connected with a nut.

In some embodiments, the gears are arranged on the positioning bolt in a sleeving mode, the gear teeth on the gears are inserted into the gear grooves in the tow bar head, and the gears rotate around the positioning bolt along with the tow bar head and move leftwards and rightwards along the positioning bolt under the effect of the gear spring; the tow bar head is arranged on the positioning bolt in a sleeving mode and can rotate around the positioning bolt.

Furthermore, the front bottom beam and the rear bottom beam may each be in a U shape, turning seats are arranged at the rear end of the front bottom beam and the front end of the rear bottom beam respectively, and the two turning seats are hinged together through a hinge shaft. In an example, the front end of the front bottom beam is hinged to the lower brackets on the front frame, and the rear end of the rear bottom beam is hinged to the lower brackets on the rear frame.

The translational collapsible wagon of the disclosure mainly has the beneficial effects of reducing the wagon in volume, attractive and making it convenient to store.

BRIEF DESCRIPTION OF THE SEVERAL VIEWS OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE DISCLOSURE

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

A further description of the disclosure is given with accompanying drawings as follows.

Referring to FIGS. 1-16, a translational collapsible wagon is disclosed including a frame assembly, a tow bar assembly and wheels 15.

In some embodiments, the tow bar assembly is arranged in front of the frame assembly, and the wheels 15 are arranged at the bottom of the frame assembly. In one example, the frame assembly includes a bottom frame, a front frame arranged in front of the bottom frame, a rear frame arranged behind the bottom frame, and collapsible side frames arranged on the left side and the right side of the bottom frame.

In some embodiments, each side frame comprises coplanar X-shaped cross tube assemblies and each coplanar X-shaped cross tube assembly comprises a first oblique tube 9, two second oblique tubes 7 and a hollow seat 8.

In one example, the first oblique tube 9 is at least 50% greater in length than either of the two second oblique tubes 7. In another example, the first oblique tube 9 is twice as long length than either of the two second oblique tubes 7.

In one instance, a strip opening is formed in the middle of the hollow seat 8 in the front-back direction, tube connectors are oppositely arranged at the front end and the rear end of the hollow seat 8 in the vertical direction respectively, the first oblique tube 9 penetrates through the strip opening and is hinged to the middle of the strip opening at the center through a hinge shaft, and the two second oblique tubes 7 are mounted in the tube connectors at the front end and the rear end of the hollow seat 8 respectively.

In some embodiments, the two second oblique tubes 7 are arranged in parallel and intersect with the first oblique tube 9 in an X shape, and the first oblique tube 9, the two second oblique tubes 7 and the hollow seat 8 are all located on the same plane. In one example, the front ends and the rear ends of the side frames are hinged to the front frame and the rear frame through upper brackets 13 and lower brackets 19 respectively. In one example, the bottom frame comprises a front bottom beam and a rear bottom beam. In another example, the rear end of the front bottom beam and the front end of the rear bottom beam can be turned by 90 degrees to be hinged together. In an example, the front end of the front bottom beam is hinged to the lower brackets of the front frame, and the rear end of the rear bottom beam is hinged to the lower brackets of the rear frame.

In some embodiments, the front frame comprises an upper cross beam 12, a lower cross beam 14, inner guide tubes 11 and outer guide tubes 12, the inner guide tubes 11 and the outer guide tubes 12 are all arranged vertically. In one example, the upper ends of the inner guide tubes 11 are connected with the upper cross beam 12 through the upper brackets 13, the lower ends of the inner guide tubes 11 are mounted in the outer guide tubes 12 in a vertically telescopic mode, and the lower ends of the outer guide tubes 12 are connected with the lower cross beam 14 through the lower brackets 19. In one example, the structure of the rear frame is the same as the structure of the front frame.

In some embodiments, each side frame comprises two coplanar X-shaped cross tube assemblies arranged side by side. For example, the two coplanar X-shaped cross tube assemblies are the front coplanar X-shaped cross tube assembly and the rear coplanar X-shaped cross tube assembly respectively. Continuing with this example, the front end of the first oblique tube of the front coplanar X-shaped cross tube assembly of the side frame on the left side of the bottom frame is hinged to the lower bracket on the left side of the front frame. Furthermore, in an example, the rear end of the first oblique tube of the front coplanar X-shaped cross tube assembly of the side frame on the left side of the bottom frame is hinged to the front end of the front second oblique tube of the rear coplanar X-shaped cross tube assembly on the same side through a hinged joint 6.

In some embodiments, the front end of the front second oblique tube of the front coplanar X-shaped cross tube assembly of the side frame on the left side of the bottom frame is hinged to the upper bracket on the left side of the front frame. Furthermore, the rear end of the rear second oblique tube of the front coplanar X-shaped cross tube assembly of the side frame on the left side of the bottom frame is hinged to the left end of a bottom beam support bar 5. In one example, the front end of the first oblique tube of the rear coplanar X-shaped cross tube assembly of the side frame on the left side of the bottom frame is hinged to the left end of the bottom beam support bar 5. In one example, the rear end of the first oblique tube of the rear coplanar X-shaped cross tube assembly of the side frame on the left side of the bottom frame is hinged to the upper bracket of the rear frame. In one example, the rear end of the rear second oblique tube of the rear coplanar X-shaped cross tube assembly of the side frame on the left side of the bottom frame is hinged to the lower bracket on the left side of the rear frame.

In some embodiments, the front end of the first oblique tube of the front coplanar X-shaped cross tube assembly of the side frame on the right side of the bottom frame is hinged to the upper bracket on the right side of the front frame, and the rear end of the first oblique tube of the front coplanar X-shaped cross tube assembly of the side frame on the right side of the bottom frame is hinged to the right end of the bottom beam support bar 5.

In an example, the front end of the front second oblique tube of the front coplanar X-shaped cross tube assembly of the side frame on the right side of the bottom frame is hinged to the lower bracket on the right side of the front frame. In one example, the rear end of the rear oblique second tube of the front coplanar X-shaped cross tube assembly of the side frame on the right side of the bottom frame is hinged to the front end of the first oblique tube of the rear coplanar X-shaped cross tube assembly on the same side through a hinged joint 6. In some embodiments, the rear end of the first oblique tube of the rear coplanar X-shaped cross tube assembly of the side frame on the right side of the bottom frame is hinged to the lower bracket on the right side of the rear frame.

In some embodiments, the front end of the front second oblique tube of the rear coplanar X-shaped cross tube assembly of the side frame on the right side of the bottom frame is hinged to the right end of the bottom beam support bar, and the rear end of the rear second oblique tube of the rear coplanar X-shaped cross tube assembly of the side frame on the right side of the bottom frame is hinged to the upper bracket of the rear frame. In one example, the bottom beam support bar 5 is located below the hinge point of the front bottom beam and the rear bottom beam.

Furthermore in some embodiments, the tow bar assembly is disclosed including a handle 1, an upper tow bar 2, a lower tow bar 3, a telescopic mechanism, a button 24, a gear adjustment mechanism and a tow bar seat 20. In one example, the upper end of the upper tow bar 2 is fixedly connected with the handle 1, the lower end of the upper tow bar 2 is mounted in the lower tow bar 3 in a vertically telescopic mode through the telescopic mechanism, and the lower end of the lower tow bar 3 is mounted on the tow bar seat 20 through a tow bar head 33.

Figure 1:
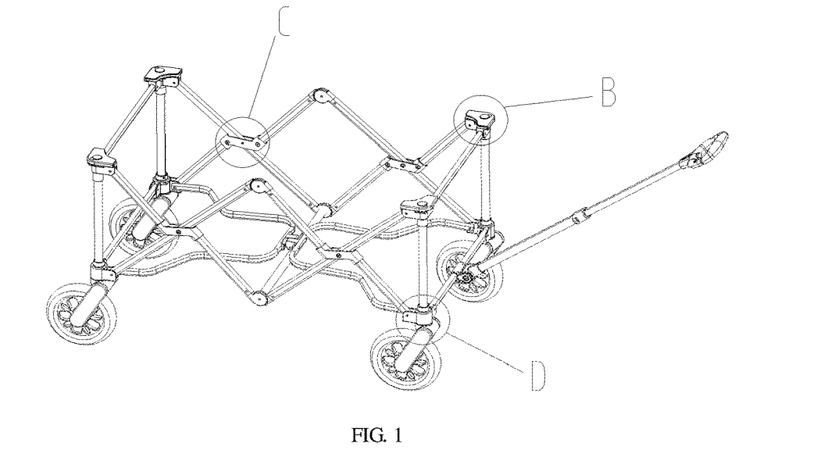
FIG. 1 is a structural schematic diagram of the disclosure.
Figure 2:
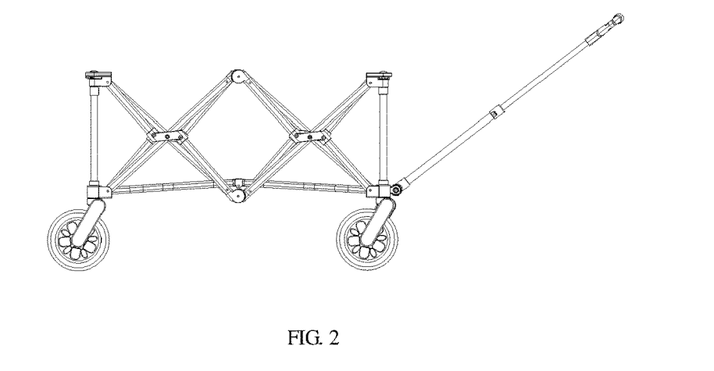
FIG. 2 is a front view of FIG. 1.
Figure 3:
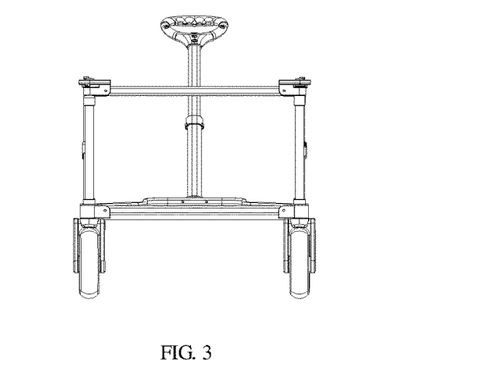
FIG. 3 is a left view of FIG. 1.
Figure 4:
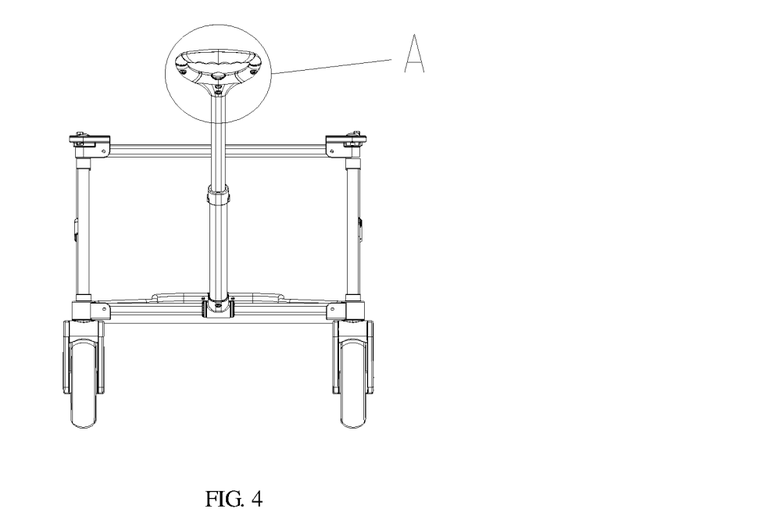
FIG. 4 is a right view of FIG. 1.
Figure 5:
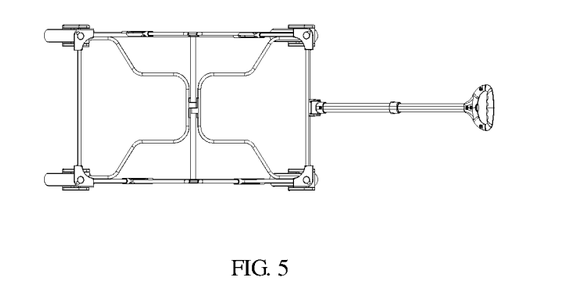
FIG. 5 is a top view of FIG. 1.
Figure 6:
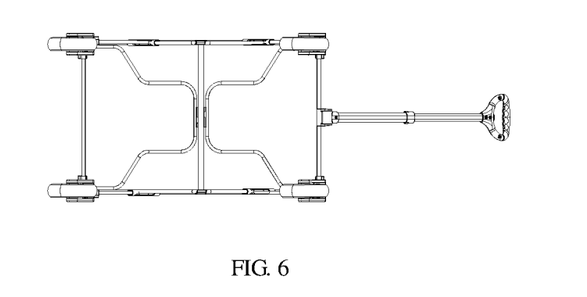
FIG. 6 is an upward view of FIG. 1.
Figure 7:
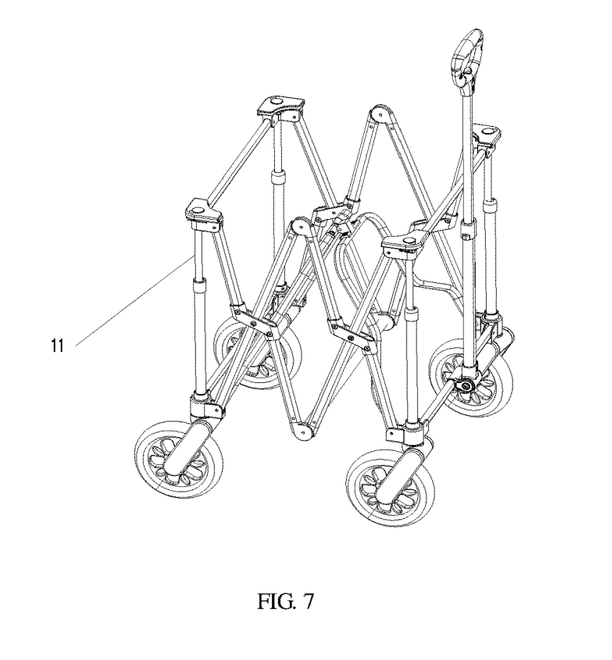
FIG. 7 is a schematic diagram of the disclosure in a semi-folded state.
Figure 8:
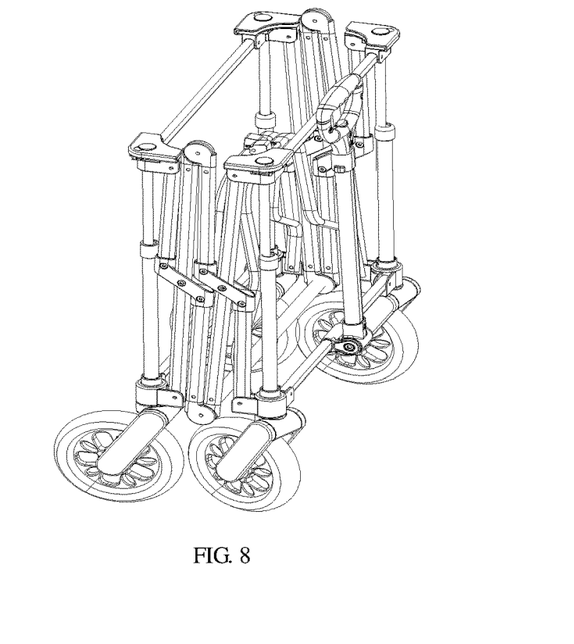
FIG. 8 is a schematic diagram of the disclosure in a full-folded state.
Figure 9:
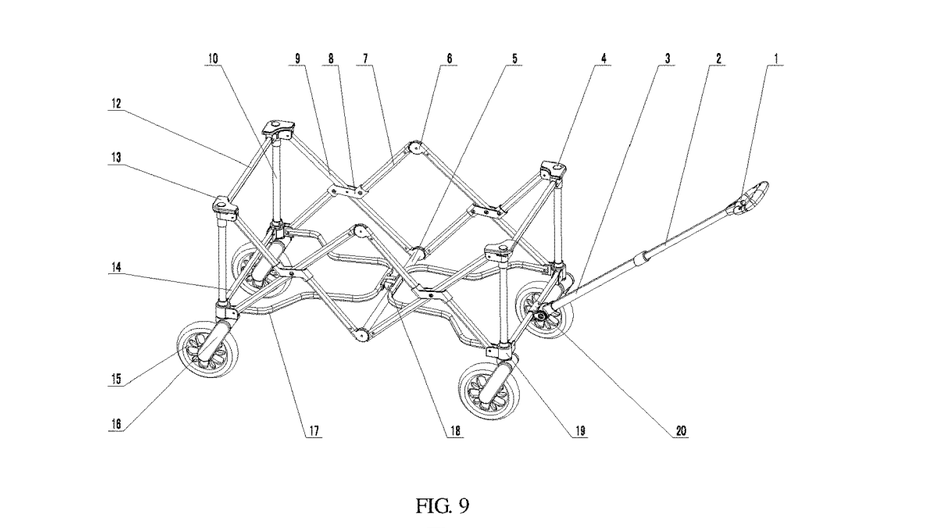
FIG. 9 is a schematic diagram of the disclosure in a full-unfolded state.
Figure 10:
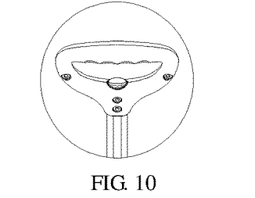
FIG. 10 is an enlarged view of A in FIG. 4.
Figure 11:
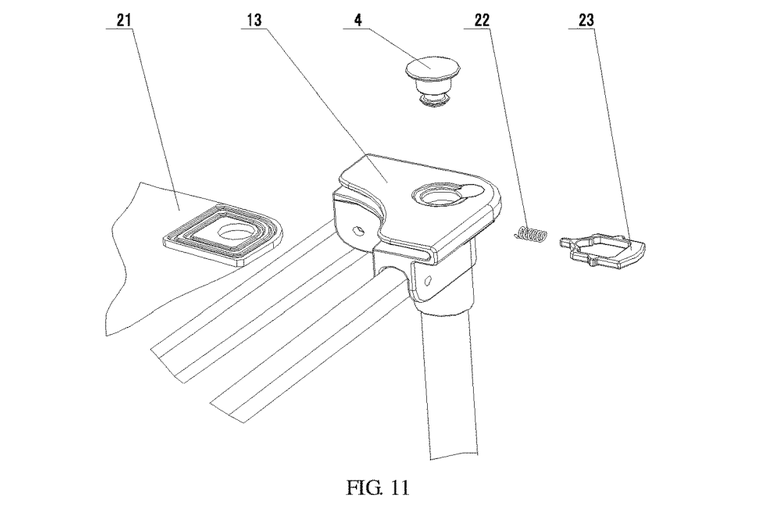
FIG. 11 is an enlarged explosive view of B in FIG. 1.
Figure 12:
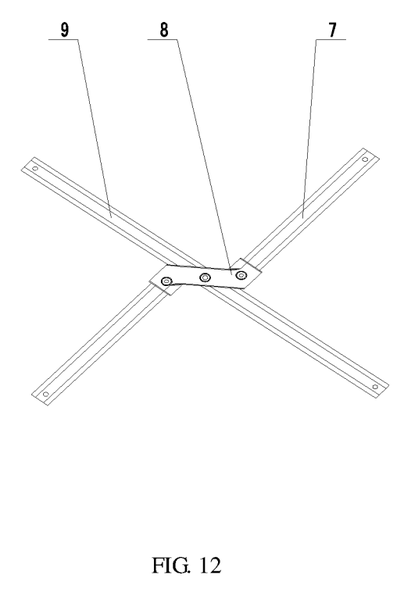
FIG. 12 is an enlarged view of C in FIG. 1.
Figure 13:
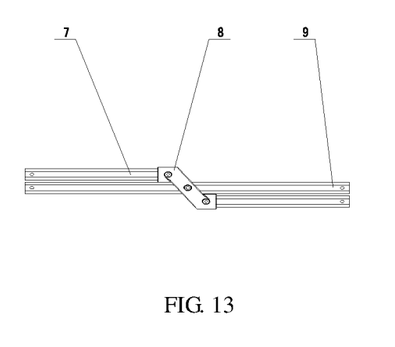
FIG. 13 is a schematic diagram of FIG. 12 in a folded state.
Figure 14:
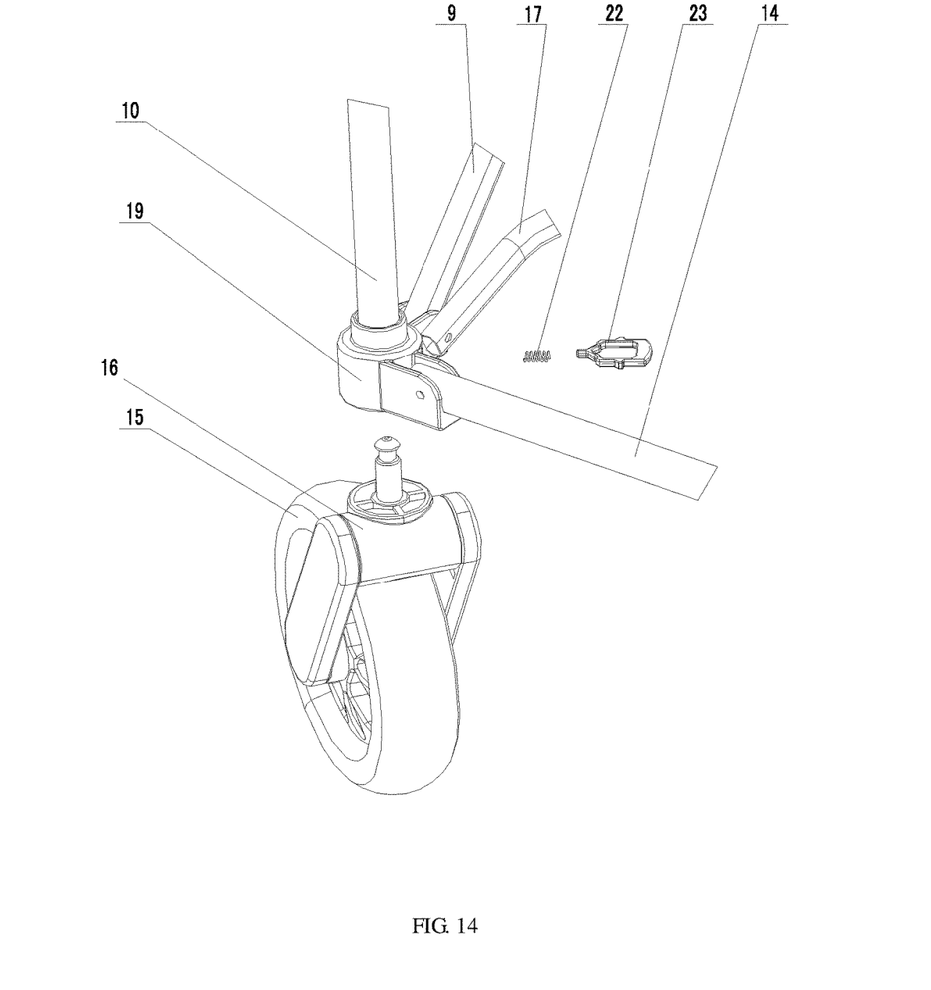
FIG. 14 is an enlarged explosive view of D in FIG. 1.
Figure 15:
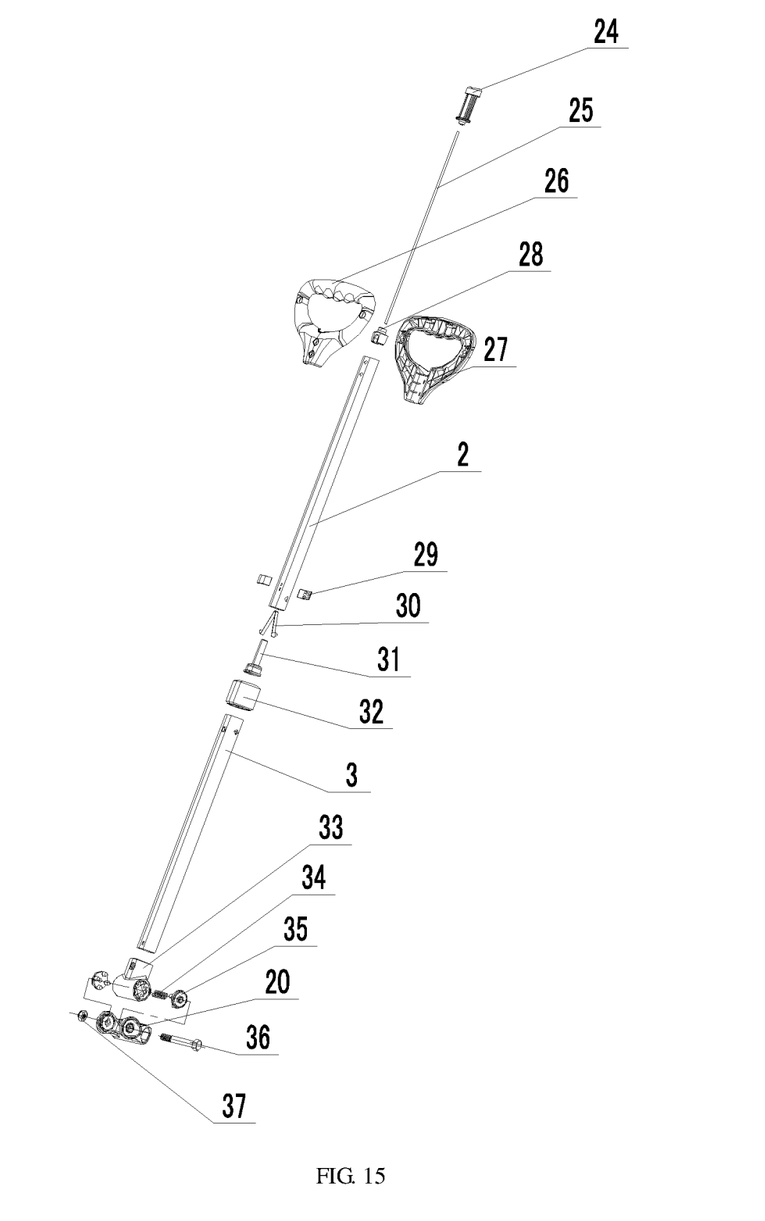
FIG. 15 is an explosive view of a spherical-tow bar mechanism.

In one example, the telescopic mechanism includes an ejection bar 25, a shifting fork 28, an ejection column 31 and a V-shaped double-headed spherical body 30, wherein the ejection bar 25 is located in the upper tow bar 2, and the upper end of the ejection bar 25 is connected with the button 24. In one example, the button 24 is located in the upper tow bar 2 and mounted at the position of the handle, the shifting fork 28 is fixed to the lower end of the ejection bar 25, the V-shaped double-headed spherical body 30 is fixed to the bottom of the shifting fork 28 from bottom to top through the ejection column, and two spherical bodies of the V-shaped double-headed spherical body 30 stretch leftwards and rightwards out of the upper tow bar 2 respectively.

In some embodiments, spherical openings used for allowing the two spherical bodies of the V-shaped double-headed spherical body 30 to be clamped therein are formed in the left right and the right side of the upper end of the lower tow bar 3 respectively, and the portions, where the spherical openings are located, of the upper end of the lower tow bar 3 are sleeved with protective jackets 32.

In some embodiments, the gear adjustment mechanism includes a tow bar seat 20, gears 35, a gear spring 34 and a positioning bolt 36, wherein the upper portion of the tow bar head 33 is fixedly connected with the lower end of the lower tow bar 3, the gears 35 are mounted on the left side and the right side of the tow bar head 33, and gear teeth are arranged on the sides, facing the tow bar head 33, of the gears 35.

In one example, the lower portion of the tow bar head 33 is in a roller shape, and gear grooves used for being matched with the gear teeth are formed in the left end and the right end of the roller respectively; the gear spring 34 is located in the roller, and the left end and the right end of the gear spring 34 are connected with the gears 35 respectively. In another example, the lower portion of the tow bar seat 20 is fixed to a frame, the upper portion of the tow bar seat 20 is in a U shape, and the tow bar head 33 is located in the U shape. In one variation, the positioning bolt 36 sequentially penetrates through the right side of the upper portion of the tow bar seat 20, the gear seat on the right side of the tow bar head 33, the right side of the tow bar head 33, the gear spring 34, the left side of the tow bar head 33, the gear seat on the left side of the tow bar head 33 and the left side of the upper portion of the tow bar seat 20 from right to left to be connected with a nut 37.

In some embodiments, the gears 35 are arranged on the positioning bolt 36 in a sleeving mode, the gear teeth on the gears 35 are inserted into the gear grooves in the tow bar head 33. In one example, the gears 35 rotate around the positioning bolt 36 along with the tow bar head and move leftwards and rightwards in the axial direction of the positioning bolt under the effect of the gear spring 34. In one example, the tow bar head 33 is arranged on the positioning bolt 36 in a sleeving mode and can rotate around the positioning bolt 36.

Furthermore in some embodiments, the wheels are connected with the lower brackets 19 through wheel quick-dismounting mechanisms, each wheel quick-dismounting mechanism comprises a wheel carrier 16, a wheel lock ring and a wheel lock ring reset spring, the wheels 15 are rotatably mounted on the wheel carriers 16, limiting shafts are arranged at the tops of the wheel carriers 16, and annular clamping grooves are formed in the upper portions of the limiting shafts. In one example, limiting shaft mounting openings are formed in the lower brackets 19 in the axial direction, wheel lock ring limiting openings used for allowing the wheel lock rings to be placed therein are formed in the lower brackets 19 in the horizontal direction.

In one example, the wheel lock rings are mounted in the wheel lock ring limiting openings in a horizontal moving mode through the wheel lock ring reset springs, and the wheel lock ring limiting openings communicate with the limiting shaft mounting openings. In another example, the limiting shafts penetrate through the limiting shaft mounting openings and the wheel lock rings from bottom to top, and the wheel lock rings are clamped in the annular clamping grooves of the limiting shafts under the effect of the wheel lock ring reset springs.

Furthermore, the wagon further may include a cloth cover quick-dismounting mechanism, and a cloth cover 21 is mounted on the frame assembly through the cloth cover quick-dismounting mechanism. In one example, the cloth cover quick-dismounting mechanism includes cloth cover lock rings, cloth cover lock ring reset springs and limiting caps 4.

In one example, cloth cover mounting grooves may be used for allowing cloth cover connecting pieces connected with the cloth cover to be placed therein and cloth cover lock ring limiting openings used for allowing the cloth cover lock rings to be placed therein are formed in the upper brackets in the horizontal direction, and the lock ring limiting openings are located below the cloth cover mounting grooves.

In some embodiments, limiting cap 4 mounting openings are formed in the upper brackets in the axial direction and communicate with the cloth cover mounting grooves and the cloth cover lock ring limiting openings, and the cloth cover lock rings are mounted in the cloth cover lock ring limiting openings in a horizontal moving mode through the cloth cover lock ring reset springs.

In one example, annular clamping grooves are formed in the lower portions of the limiting caps 4, and the limiting caps 4 penetrate through the limiting cap mounting openings, the cloth cover connecting pieces and the cloth cover lock rings from top to bottom, and the cloth cover lock rings are clamped in the annular clamping grooves in the limiting caps 4.

Furthermore, in some embodiments, the tow bar assembly may include a handle 1, an upper tow bar 2, a lower tow bar 3, a telescopic mechanism, a button 24, a gear adjustment mechanism and a tow bar seat. In one instance, the upper end of the upper tow bar 2 is fixedly connected with the handle, the lower end of the upper tow bar 2 is mounted in the lower tow bar 3 in a vertically telescopic mode through the telescopic mechanism, and the lower end of the lower tow bar 3 is mounted on the tow bar seat 20 through a tow bar head 33.

Figure 16:
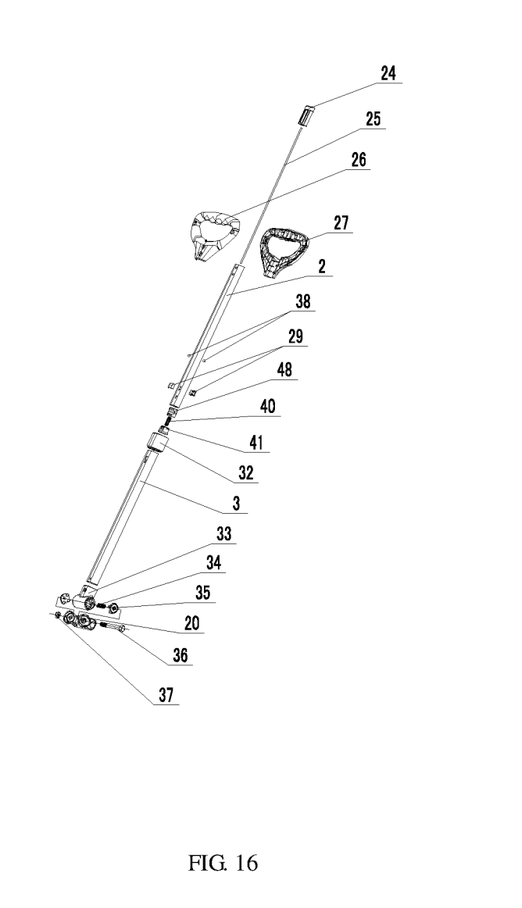
FIG. 16 is an explosive view of a steel ball-tow bar mechanism.

In one example, the telescopic mechanism may include an ejection bar 25, a steel ball seat 48, steel balls 38, an ejection spring 40 and a spring seat 41. In one instance, the ejection bar 25 is located in the upper tow bar 2, the upper end of the ejection bar 25 is connected with the button 24, and the button 24 is located in the upper tow bar 2 and mounted at the position of the handle. In one example, the steel ball seat 48 is fixed to the lower end of the ejection bar 25, and the spring seat 41 is located below the steel ball seat 48 and mounted in the upper tow bar 2. In one example, the upper end of the ejection spring 40 is connected with the steel ball seat 48, and the lower end of the ejection spring 40 is mounted on the spring seat 41.

In some embodiments, a positioning piece is arranged above the steel ball seat 48, unlocking grooves and limiting grooves are formed in the steel ball seat 48 from top to bottom, and first limiting openings used for allowing the steel balls 38 to be clamped therein for limiting are formed in the front side and the rear side of the lower end of the upper tow bar 2 respectively. In one example, second limiting openings corresponding to the first limiting openings are formed in the front side and the rear side of the upper end of the lower tow bar 3 respectively, and the portions, where the second limiting openings are located of the upper end of the lower tow bar 3 being sleeved with protective jackets 32.

In some embodiments, the steel balls 38 are clamped into the limiting grooves and the second limiting openings simultaneously when the upper tow bar 2 stretches out of the lower tow bar 3 and is locked, and the steel balls 38 slide out of the limiting grooves to be clamped into the unlocking grooves when the upper tow bar 2 retracts into the lower tow bar and is unlocked.

In one example, the gear adjustment mechanism may include gears 35, a gear spring 34 and a positioning bolt 36. In one instance, the upper portion of the tow bar head 33 is fixedly connected with the lower end of the lower tow bar 3, the gears 35 are mounted on the left side and the right side of the tow bar head 33, and gear teeth are mounted on the sides, facing the tow bar head 33, of the gears 35.

In an instance, the lower portion of the tow bar head 33 is in a roller shape, gear grooves used for being matched with the gear teeth are formed in the left end and the right end of the roller respectively. In one example, the gear spring 34 is located in the roller, and the left end and the right end of the gear spring are connected with the gears 35 respectively.

In an example, the lower portion of the tow bar seat 20 is fixed to the frame, the upper portion of the tow bar seat is in a U shape, and the tow bar head 33 is located in the U shape. In an example, the positioning bolt sequentially penetrates through the right side of the upper portion of the tow bar seat 20, the gear seat on the right side of the tow bar head, the right side of the tow bar head 33, the gear spring, the left side of the tow bar head 33, the gear seat on the left side of the tow bar head and the left side of the upper portion of the tow bar seat 20 from right to left to be connected with a nut 37.

In some embodiments, the gears 35 are arranged on the positioning bolt 36 in a sleeving mode, the gear teeth on the gears are inserted into the gear grooves in the tow bar head, and the gears rotate around the positioning bolt 36 along with the tow bar head and move leftwards and rightwards along the positioning bolt under the effect of the gear spring 34. In one example, the tow bar head 33 is arranged on the positioning bolt 36 in a sleeving mode and can rotate around the positioning bolt 36.

Furthermore, the front bottom beam and the rear bottom beam are each in a U shape, turning seats 18 are arranged at the rear end of the front bottom beam and the front end of the rear bottom beam respectively, and the two turning seats 18 are hinged together through a hinge shaft; the front end of the front bottom beam is hinged to the lower brackets on the front frame, and the rear end of the rear bottom beam is hinged to the lower brackets on the rear frame.

In some embodiments, the lock rings 23 include the wheel lock rings and the cloth cover lock rings, and the reset springs 22 include the wheel lock ring reset springs and the cloth cover lock ring reset springs.

In some embodiments, the first oblique tubes 9 penetrate into the strip openings, and the middle portions of the first oblique tubes 9 are hinged to the middle portions of the strip openings, the second oblique tubes 7 include the first oblique tubes 9 and the second oblique tubes 7, the front ends of the first oblique tubes 9 are hinged to the rear ends of the hollow seats 8, the rear ends of the second oblique tubes 7 are hinged to the front ends of the hollow seats, and the first oblique tubes 9 and the second oblique tubes 7 are arranged in parallel between every two adjacent coplanar X-shaped cross tube assemblies.

In some embodiments, the first oblique tubes 9 greater than or equal two 2 times as great in length as either of the two second oblique tubes 7. In one example, the first oblique tube is at least 50% greater in length than either of the two second oblique tubes 7.

In one example, a fixing block is arranged at the lower end of the ejection column and attached to the inner wall of the lower tow bar 3. In another example, the double-headed spherical body is fixed to the ejection column through the positioning piece. In this example, the bottom frame is formed by connecting the two U-shaped bottom beams 17 through the turning seats 18 which can turn by 90 degrees, the four corners of the two bottom beams 17 are hinged to the four lower brackets 19 respectively. As such, the front bottom beam and the rear bottom beam are arranged symmetrically.

When the wagon is unfolded, the turning seats 18 move downwards to stretch so as to place the two U-shaped bottom beams 17 on the same plane and press them against the bottom beam support bar 5.

On the other hand, when the wagon is folded, the turning seats 18 move upwards to contract so as to make the two U-shaped bottom beams 17 in parallel, and accordingly the four lower brackets 19 are driven to draw close to one another.

In some embodiments, each side frame is formed by hinging two or more coplanar X-shaped cross tube assemblies each composed of the first oblique tube 9 penetrating through the hollow seat 8 and the two second oblique tubes 7 fixed to the two ends of the first oblique tube 9 through the hinged joints 6 and then connecting the coplanar X-shaped cross tube assemblies with the upper brackets 13 and the lower brackets 19. In some embodiments, one ends of the first oblique tubes 9 are connected with the lower brackets 19, the other ends of the first oblique tubes 9 are connected with the hinged joints 6, and the middle portions of the first oblique tubes 9 penetrate through the strip openings in the hollow seats 8 to be connected with the hollow seats 8.

In some embodiments, one end of one of the two second oblique tubes 7 completely fixed to the two ends of each hollow seat 8 is riveted to the corresponding upper bracket 13, and one end of the other of the two second oblique tubes 7 completely fixed to the two ends of each hollow seat 8 is riveted to the corresponding hinged joint 6. Similarly, the other one or more coplanar X-shaped cross tube assemblies are connected in the same way.

When the wagon is unfolded, the coplanar X-shaped cross tube assemblies rotate with the junctions of the hollow seats 8 and the first oblique tubes 9 as centers, and the four corners are driven to rotate around the upper brackets 13, the lower brackets 19 and the junction of the two hinged joints 6 until the first oblique tubes 9 reach the limiting positions in the strip openings in the hollow seats 8.

When the wagon is folded, the coplanar X-shaped cross tube assemblies rotate with the junctions of the hollow seats 8 and the first oblique tubes 9 as centers, and the four corners are driven to rotate around the upper brackets 13, the lower brackets 19 and the junction of the two hinged joints 6 until the first oblique tubes 9 are parallel to and adjacent to the second oblique tubes 7.

In some embodiments, the front frame and the rear frame are each composed of the integrity formed by connecting the upper cross beam 12 and the two upper brackets 13 at the two ends of the upper cross beam 12, the integrity formed by connecting the lower cross beam 14 and the two lower brackets 19 at the two ends of the lower cross beam 14, the outer guide tubes 10 connected to the lower brackets 19, and the inner guide tubes 11 arranged in the outer guide tubes 10 in a sleeved mode and connected with the upper brackets 13.

When the wagon is unfolded, the front frame and the rear frame integrally and horizontally move forwards and backwards while the coplanar X-shaped cross tube assemblies stretch towards the two sides, and at the same time, each upper cross beam 12 and the two upper brackets 13 integrally connected with the upper cross beam 12 press the inner guide tubes 11 downwards into the outer guide tubes 10 until the upper brackets 13 are pressed to the outer guide tubes 10.

When the wagon is folded, the front frame and the rear frame are driven to integrally and horizontally move to close to each other while the coplanar X-shaped cross tube assemblies draw close to one another, and at the same time, each upper cross beam 12 and the two upper brackets 13 integrally connected with the upper cross beam 12 lift the inner guide tubes 11 upwards from the outer guide tubes 10 until the first oblique tubes 9 are parallel to and adjacent to the second oblique tubes 7.

For example, the wheels are connected to the wheel carriers 16 through the hinge shafts, and the wheel carriers 16 are fixed to the lower brackets 19 through the wheel quick-dismounting mechanisms. In this way, the wheels and the lower brackets 19 move synchronously when the wagon is folded and unfolded.

In some embodiments, the tow bar assembly is composed of the tow bar seat 20 fixed to the lower cross beam 14, the lower tow bar 3 connected with the tow bar seat 20 though a hinge pin, the upper tow bar 2 inserted into the lower tow bar 3, and the handle 1 fixed to the upper tow bar 2. In one example, the upper tow bar 2 is pulled out of the lower tow bar 3 where the upper tow bar 2 is inserted and is locked when the wagon is unfolded. As such, the wagon can be pulled conveniently.

On the other hand when the wagon is folded, the locking buckle, namely the telescopic mechanism, between the upper tow bar 2 and the lower tow bar 3 is released firstly, then the upper tow bar 2 is pushed into the lower tow bar 3, and thus the wagon can be packed conveniently.

When the wagon is unfolded, a spherical-tow bar mechanism grabs the handle and pulls the handle upwards, the upper tow bar assembly is driven to integrally move upwards until the V-shaped double-headed spherical body 30 is clamped in an opening in the upper end of the lower tow bar 3, and thus a limiting function is achieved. Meanwhile, the lower portion of the ejection column 31 is limited by the positioning piece 29.

When the wagon is folded, the button 24 is pressed firstly, the ejection rod 25 and the shifting fork 28 are driven to move downwards, the double-headed spring 30 is made to disengage from the opening of the lower tow bar 3, and thus the locking state is relieved; then the handle is pushed downwards to the maximum extent, and the button 24 is released.

When the wagon is unfolded, a steel ball-tow bar mechanism grabs the handle and pulls the handle upwards, the upper tow bar assembly is driven to integrally move upwards until the steel balls 38 in the upper tow bar 2 are clamped in the second limiting openings in the upper end of the lower tow bar 3, and thus a limiting function is achieved.

On the other hand, when the wagon is folded, the button 24 is pressed firstly, the ejection rod 25 is made to push the steel ball seat 28 to move downwards, the steel balls 38 are made to slide into the unlocking grooves from the limiting grooves of the steel ball seat 48, the steel balls 38 are made to disengage from the second limiting openings of the lower tow bar 3 accordingly, and the locking state is relieved.

Following, then the handle is pushed downwards to the maximum extent, and the button 24 is released.

In some embodiments, a circle of gear teeth are arranged on the outer side of each of the two gears 35 and matched with the gear grooves in the corresponding sides of the tow bar head 33 and tightly abut against the gear grooves under the effect of the gear spring 34 between the two gears 35. In one example, when the tow bars are rotated, the tow bar head 33 connected with the lower tow bar 3 drives the gear spring 34 in the tow bar head 33 and the gears 35 at the two ends to rotate around the positioning bolt 36. In this example, the tow bar seat 20 is fixed to the lower cross beam of the frame assembly and does not rotate, the gear teeth on the gears 35 enter different gear grooves in the tow bar head 33 under the effect of the gear spring 34 during rotation, and thus the tow bar assembly can stay at different rotating positions.

Upon reading this specification, it should be appreciated that, under appropriate circumstances, considering such issues as user requirements or wishes, design considerations, marketing preferences, cost(s), structural requirement(s), available materials, technological advances, etc., other methods of use arrangements such as, for example, orders within above-mentioned list that are different, eliminated and/or additional steps, including or eliminating, for example, procedure, process, and/or maintenance step(s), etc., may be sufficient.

It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context.

In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, and as described herein are expressly contemplated as being equivalent within the scope of the claims and understood by those knowledgeable in the art. Therefore, obvious substitutions now or later known to one with ordinary skill in the art are defined to be within the scope of the defined elements and the reading of the specification as described herein.

The claims are thus to be understood to include what is specifically illustrated and described above, what is conceptually equivalent, what can be obviously substituted and also what essentially incorporates the essential idea of the embodiment. In addition, where the specification and claims refer to at least one of something selected from the group consisting of A, B, C . . . and N, the text should be interpreted as requiring only one element from the group, not A plus N, or B plus N, etc

What is claimed is:

1. A translational collapsible wagon, comprising:
    a frame assembly;
    a tow bar assembly and wheels; and
    tube connectors;
    wherein the tow bar assembly is arranged in front of the frame assembly, the wheels are arranged at the bottom of the frame assembly, and the frame assembly comprises:
    a bottom frame, a front frame arranged in front of the bottom frame, a rear frame arranged behind the bottom frame, and collapsible side frames arranged on the left side and the right side of the bottom frame;
    wherein the front frame comprises an upper cross beam, a lower cross beam, inner guide tubes and outer guide tubes, the inner guide tubes and the outer guide tubes are all arranged vertically;
    wherein each side frame comprises coplanar X-shaped cross tube assemblies;
    wherein each coplanar X-shaped cross tube assembly comprises a first oblique tube, two second oblique tubes and a hollow seat;
    wherein the tube connectors oppositely arranged at a front end and a rear end of the hollow seat in the vertical direction respectively;
    wherein the two second oblique tubes are mounted in the tube connectors at the front end and the rear end of the hollow seat respectively, and the two second oblique tubes are arranged in parallel and intersect with the first oblique tube in an X shape.

2. The translational collapsible wagon of claim 1, comprising
    wherein a strip opening is formed in the middle of the hollow seat and the first oblique tube that penetrates through the strip opening of the hollow seat and is hinged about the strip opening through a hinge shaft; and
    wherein the first oblique tube is at least 50% greater in length than either of the two second oblique tubes.

3. The translational collapsible wagon of claim 1,
    wherein about the strip opening through a hinge shaft includes the center of the strip opening through a hinge shaft.

4. The translational collapsible wagon of claim 1, wherein the first oblique tube, the two second oblique tubes and the hollow seat are all located on the same plane.

5. The translational collapsible wagon of claim 1, wherein the front ends and the rear ends of the side frames are hinged to the front frame and the rear frame through upper brackets and lower brackets respectively.

6. The translational collapsible wagon of claim 1, wherein the bottom frame comprises a front bottom beam and a rear bottom beam, the rear end of the front bottom beam and the front end of the rear bottom beam are turned by 90 degrees to be hinged together, the front end of the front bottom beam is hinged to the lower brackets of the front frame, and the rear end of the rear bottom beam is hinged to the lower brackets of the rear frame.

7. The translational collapsible wagon of claim 6, wherein the upper ends of the inner guide tubes are connected with the upper cross beam through the upper brackets, the lower ends of the inner guide tubes are mounted in the outer guide tubes in a vertically telescopic mode, and the lower ends of the outer guide tubes are connected with the lower cross beam through the lower brackets and the structure of the rear frame is the same as the structure of the front frame.

8. The translational collapsible wagon of claim 1, wherein each side frame comprises:
    two coplanar X-shaped cross tube assemblies arranged side by side, the two coplanar X-shaped cross tube assemblies are a front coplanar X-shaped cross tube assembly and a rear coplanar X-shaped cross tube assembly respectively.

9. The translational collapsible wagon of claim 8, wherein the front end of the first oblique tube of the front coplanar X-shaped cross tube assembly of the side frame on the left side of the bottom frame is hinged to the lower bracket on the left side of the front frame, and the rear end of the first oblique tube of the front coplanar X-shaped cross tube assembly of the side frame on the left side of the bottom frame is hinged to the front end of the front second oblique tube of the rear coplanar X-shaped cross tube assembly on the same side through a hinged joint.

10. The translational collapsible wagon of claim 1,
wherein the front end of the front second oblique tube of the front coplanar X-shaped cross tube assembly of the side frame on the left side of the bottom frame is hinged to the upper bracket on the left side of the front frame, and
wherein the rear end of the rear second oblique tube of the front coplanar X-shaped cross tube assembly of the side frame on the left side of the bottom frame is hinged to the left end of a bottom beam support bar.

11. The translational collapsible wagon of claim 1,
wherein the front end of the first oblique tube of the rear coplanar X-shaped cross tube assembly of the side frame on the left side of the bottom frame is hinged to the left end of the bottom beam support bar;
wherein the rear end of the first oblique tube of the rear coplanar X-shaped cross tube assembly of the side frame on the left side of the bottom frame is hinged to the upper bracket of the rear frame, and
wherein the rear end of the rear second oblique tube of the rear coplanar X-shaped cross tube assembly of the side frame on the left side of the bottom frame is hinged to the lower bracket on the left side of the rear frame.

12. The translational collapsible wagon of claim 1,
wherein the front end of the first oblique tube of the front coplanar X-shaped cross tube assembly of the side frame on the right side of the bottom frame is hinged to the upper bracket on the right side of the front frame;
wherein the rear end of the first oblique tube of the front coplanar X-shaped cross tube assembly of the side frame on the right side of the bottom frame is hinged to the right end of the bottom beam support bar, and
wherein the front end of the front second oblique tube of the front coplanar X-shaped cross tube assembly of the side frame on the right side of the bottom frame is hinged to the lower bracket on the right side of the front frame, and the rear end of the rear oblique second tube of the front coplanar X-shaped cross tube assembly of the side frame on the right side of the bottom frame is hinged to the front end of the first oblique tube of the rear coplanar X-shaped cross tube assembly on the same side through a hinged joint.

13. The translational collapsible wagon of claim 12,
wherein the rear end of the first oblique tube of the rear coplanar X-shaped cross tube assembly of the side frame on the right side of the bottom frame is hinged to the lower bracket on the right side of the rear frame, the front end of the front second oblique tube of the rear coplanar X-shaped cross tube assembly of the side frame on the right side of the bottom frame is hinged to the right end of the bottom beam support bar, and
wherein the rear end of the rear second oblique tube of the rear coplanar X-shaped cross tube assembly of the side frame on the right side of the bottom frame is hinged to the upper bracket of the rear frame; the bottom beam support bar is located below the hinge point of the front bottom beam and the rear bottom beam.

14. The translational collapsible wagon of claim 1,
wherein the tow bar assembly comprises a handle, an upper tow bar, a lower tow bar, a telescopic mechanism, a button, a gear adjustment mechanism and a tow bar seat;
wherein the upper end of the upper tow bar is fixedly connected with the handle, the lower end of the upper tow bar is mounted in the lower tow bar in a vertically telescopic mode through the telescopic mechanism, and the lower end of the lower tow bar is mounted on the tow bar seat through a tow bar head; and
wherein the telescopic mechanism comprises an ejection bar, a shifting fork, an ejection column and a double-headed spherical body; wherein the ejection bar is located in the upper tow bar, the upper end of the ejection bar is connected with the button, the button is located in the upper tow bar and mounted at the position of the handle, the shifting fork is fixed to the lower end of the ejection bar, the double-headed spherical body is fixed to the bottom of the shifting fork from bottom to top through the ejection column.

15. The translational collapsible wagon of claim 1,
wherein two spherical bodies of the double-headed spherical body stretch leftwards and rightwards out of the upper tow bar respectively; spherical openings used for allowing the two spherical bodies of the double-headed spherical body to be clamped therein are formed on the left right and the right side of the upper end of the lower tow bar respectively, and the portions, where the spherical openings are located, of the upper end of the lower tow bar are sleeved with protective jackets; and
wherein the gear adjustment mechanism comprises a tow bar seat, gears, a gear spring and a positioning bolt, wherein the upper portion of the tow bar head is fixedly connected with the lower end of the lower tow bar, the gears are mounted on the left side and the right side of the tow bar head, and gear teeth are arranged on the sides, facing the tow bar head, of the gears; the lower portion of the tow bar head is in a roller shape, and gear grooves used for being matched with the gear teeth are formed in the left end and the right end of the roller respectively; the gear spring is located in the roller, and the left end and the right end of the gear spring are connected with the gears respectively;
wherein the lower portion of the tow bar seat is fixed to the frame, the upper portion of the tow bar seat is in a U shape, and the tow bar head is located in the U shape; and
wherein the positioning bolt sequentially penetrates through the right side of the upper portion of the tow bar seat, the gear seat on the right side of the tow bar head, the right side of the tow bar head, the gear spring, the left side of the tow bar head, the gear seat on the left side of the tow bar head and the left side of the upper portion of the tow bar seat from right to left to be connected with a nut; the gears are arranged on the positioning bolt in a sleeving mode, the gear teeth on the gears are inserted into the gear grooves in the tow bar head, and the gears rotate around the positioning bolt along with the tow bar head and move leftwards and rightwards in the axial direction of the positioning bolt under the effect of the gear spring; the tow bar head is arranged on the positioning bolt in a sleeving mode and can rotate around the positioning bolt.

16. The translational collapsible wagon of claim 1,
wherein the wheels are connected with the lower brackets through wheel quick-dismounting mechanisms, each wheel quick-dismounting mechanism comprises a wheel carrier, a wheel lock ring and a wheel lock ring reset spring, the wheels are rotatably mounted on the wheel carriers, limiting shafts are arranged at the tops of the wheel carriers, and annular clamping grooves are formed in the upper portions of the limiting shafts;

wherein limiting shaft mounting openings are formed in the lower brackets in the axial direction, wheel lock ring limiting openings used for allowing the wheel lock rings to be placed therein are formed in the lower brackets in the horizontal direction, the wheel lock rings are mounted in the wheel lock ring limiting openings in a horizontal moving mode through the wheel lock ring reset springs, and the wheel lock ring limiting openings communicate with the limiting shaft mounting openings; and wherein the limiting shafts penetrate through the limiting shaft mounting openings and the wheel lock rings from bottom to top, and the wheel lock rings are clamped in the annular clamping grooves of the limiting shafts under the effect of the wheel lock ring reset springs.

17. The translational collapsible wagon of claim 1, comprising a cloth cover quick-dismounting mechanism, and a cloth cover is mounted on the frame assembly through the cloth cover quick-dismounting mechanism; the cloth cover quick-dismounting mechanism comprises cloth cover lock rings, cloth cover lock ring reset springs and limiting caps; cloth cover mounting grooves used for allowing cloth cover connecting pieces connected with the cloth cover to be placed therein and cloth cover lock ring limiting openings used for allowing the cloth cover lock rings to be placed therein are formed in the upper brackets in the horizontal direction, and wherein the lock ring limiting openings are located below the cloth cover mounting grooves; limiting cap mounting openings are formed in the upper brackets in the axial direction and communicate with the cloth cover mounting grooves and the cloth cover lock ring limiting openings;

wherein the cloth cover lock rings are mounted in the cloth cover lock ring limiting openings in a horizontal moving mode through the cloth cover lock ring reset springs; and wherein annular clamping grooves are formed in the lower portions of the limiting caps, and the limiting caps penetrate through the limiting cap mounting openings, the cloth cover connecting pieces, and the cloth cover lock rings from top to bottom, and the cloth cover lock rings are clamped in the annular clamping grooves in the limiting caps.

18. The translational collapsible wagon of claim 1, wherein the tow bar assembly comprises a handle, an upper tow bar, a lower tow bar, a telescopic mechanism, a button, a gear adjustment mechanism and a tow bar seat;

wherein the upper end of the upper tow bar is fixedly connected with the handle, the lower end of the upper tow bar is mounted in the lower tow bar in a vertically telescopic mode through the telescopic mechanism, and the lower end of the lower tow bar is mounted on the tow bar seat through a tow bar head;

wherein the telescopic mechanism comprises an ejection bar, a steel ball seat, steel balls, an ejection spring and a spring seat, wherein the ejection bar is located in the upper tow bar, the upper end of the ejection bar is connected with the button, and the button is located in the upper tow bar and mounted at the position of the handle; the steel ball seat is fixed to the lower end of the ejection bar, the spring seat is located below the steel ball seat and mounted in the upper tow bar, the upper end of the ejection spring is connected with the steel ball seat, and the lower end of the ejection spring is mounted on the spring seat;

wherein a positioning piece is arranged above the steel ball seat, unlocking grooves and limiting grooves are formed in the steel ball seat from top to bottom, first limiting openings used for allowing the steel balls to be clamped therein for limiting are formed in the front side and the rear side of the lower end of the upper tow bar respectively, second limiting openings corresponding to the first limiting openings are formed in the front side and the rear side of the upper end of the lower tow bar respectively, and the portions;

wherein the second limiting openings are located, of the upper end of the lower tow bar are sleeved with protective jackets; the steel balls are clamped into the limiting grooves and the second limiting openings simultaneously when the upper tow bar stretches out of the lower tow bar and is locked, and the steel balls slide out of the limiting grooves to be clamped into the unlocking grooves when the upper tow bar retracts into the lower tow bar and is unlocked;

wherein the gear adjustment mechanism comprises gears, a gear spring and a positioning bolt, wherein the upper portion of the tow bar head is fixedly connected with the lower end of the lower tow bar, the gears are mounted on the left side and the right side of the tow bar head, and gear teeth are mounted on the sides, facing the tow bar head, of the gears; the lower portion of the tow bar head is in a roller shape, gear grooves used for being matched with the gear teeth are formed in the left end and the right end of the roller respectively, the gear spring is located in the roller, and the left end and the right end of the gear spring are connected with the gears respectively; the lower portion of the tow bar seat is fixed to the frame, the upper portion of the tow bar seat is in a U shape;

wherein the tow bar head is located in the U shape; the positioning bolt sequentially penetrates through the right side of the upper portion of the tow bar seat, the gear seat on the right side of the tow bar head, the right side of the tow bar head, the gear spring, the left side of the tow bar head, the gears on the left side of the tow bar head and the left side of the upper portion of the tow bar seat from right to left to be connected with a nut;

wherein the gears are arranged on the positioning bolt in a sleeving mode, the gear teeth on the gears are inserted into the gear grooves in the tow bar head, and the gears rotate around the positioning bolt along with the tow bar head and move leftwards and rightwards along the positioning bolt under the effect of the gear spring; and wherein the tow bar head is arranged on the positioning bolt in a sleeving mode and can rotate around the positioning bolt.

19. The translational collapsible wagon of claim 1, wherein the front bottom beam and the rear bottom beam are each in a U shape, turning seats are arranged at the rear end of the front bottom beam and the front end of the rear bottom beam respectively, and wherein the two turning seats are hinged together through a hinge shaft; the front end of the front bottom beam is hinged to the lower brackets on the front frame, and the rear end of the rear bottom beam is hinged to the lower brackets on the rear frame.

* * * * *